Patented Nov. 1, 1932

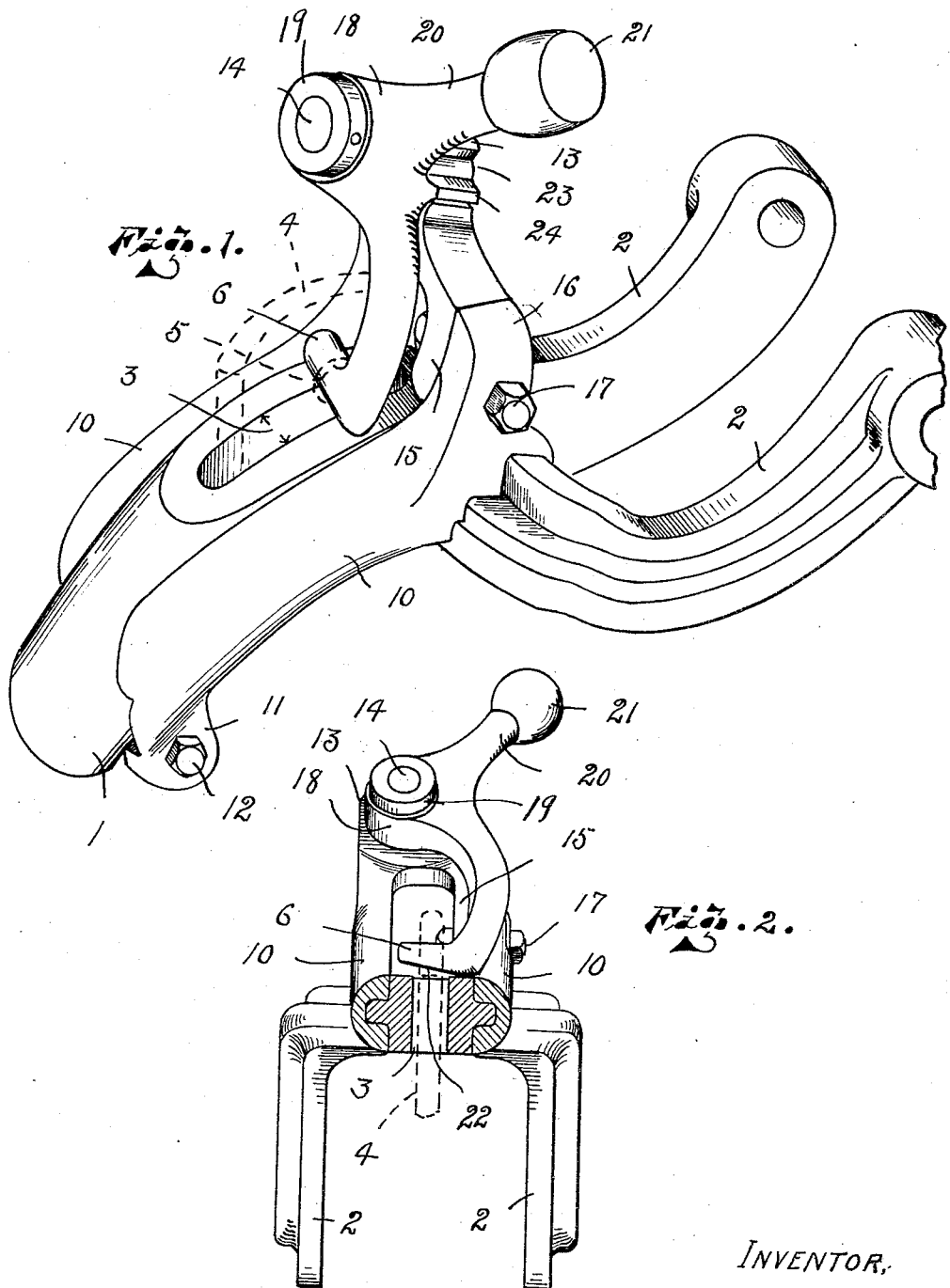

1,885,961

UNITED STATES PATENT OFFICE

PETER SWANSON, OF ELY, MINNESOTA

RAILROAD SWITCH STAND DOG

Application filed July 7, 1932, Serial No. 621,153, and in Canada November 5, 1931.

This invention relates to switch stand dogs, and has special reference to a novel type of dog or catch and supporting bracket therefor.

The principal object is to provide a simple, inexpensive and effective device of this character, and one readily applicable to the present type of switch stand lever without modification.

Another object is to provide means whereby the locking dog or catch is automatically engaged with the lug of the switch stand when the operating lever is down to its closed position.

Other minor objects and advantages of the invention will appear in the following description thereof.

Referring now to the accompanying drawing, forming part of this application, and wherein like reference characters indicate like parts:

Figure 1 is a perspective view of one embodiment of the invention as applied to a common switch stand lever as found in what is known as yard inside switches; and Figure 2 is a reduced vertical section through that portion of the dog bracket which is clamped to the lever.

1 represents a common switch stand lever, bifurcated at its pivotally mounted end, forming the spaced members 2, and adjacent which is formed the vertically elongated slot 3 for the reception of the lug 4 of the switch stand which is shown in dotted lines. This lug, as is well known to those versed in the art, is provided with a hole 5 for the reception of the finger like end 6 of the dog for securely holding same in cooperative relation.

The present invention resides in the specific form of dog and bracket therefor, the latter comprising or being formed in two irregularly shaped parts, the major portion 10 of each part being designed to conform to the shape of and extend for some distance about the handle 1 adjacent its junction with the bifurcated portion 2. The free end of each portion 10 is provided with a depending lug 11 having a hole therein, through which a holding bolt 12 extends for secure clamping of the free end of the bracket to the handle. The opposite end of one of the portions 10 extends upwardly over the union of the handle with the bifurcated portion and terminates in an arcuately shaped portion 13, centrally of which and at right angles thereto is integrally formed the pintle 14, upon which the dog is pivotally mounted. The arcuately shaped portion 13 is provided with an integrally formed leg 15 which extends downwardly and adjacent an upward extension 16 of the other member 10, the leg 15 and extension 16 each being provided with registrable holes through which may extend a holding bolt 17 for securely uniting, with the bolt 12, the two-part bracket about the handle.

The portion 13 is disposed at an angle so that the pintle 14 will extend in a proper position for supporting the dog so that the finger end 6 thereof will traverse the handle transversely the latter above and centrally of the slot 3 therein. The hub 18 of the dog is provided with a hole therein for engagement over the bolt 14, and a suitable nut 19 upon the bolt 14 holds the bolt in proper freely rotatable position thereupon.

At substantially right angles to the finger portion of the dog is formed integrally therewith the weighted handle portion 20, the weight or knob being shown at 21. This handle and its weight are designed to bias the dog in particularly its locking position, or in lieu of this the crook in the dog itself may be of abnormal size to accomplish like results except that the convenience of the portion 20 acting as a handle for the dog would be lost.

The automatic engagement of the locking dog with the switch stand lug when the switch handle is lowered without the dog being manually manipulated is accomplished by forming the free lug engaging end of the dog inclined as shown at 22 so that as the end of the lug engages said terminal of the dog as the handle is pushed downwardly, the dog will swing outwardly until the end of the lug is passed, and then the hole 5 in the lug will occur in the path of the dog and the latter by gravity become engaged therein.

The arcuately shaped portion 13 has a relatively wide notch 23 formed therein into which extends the laterally projecting finger 24 integrally formed upon the hub 18 of the dog, so that as the dog is rotated on the pintle 14 its limit of rotation will be defined by the finger abutting either edge of the notch and form a stop therefor.

From the foregoing it is evident that I have illustrated a decidedly novel type of removable dog supporting bracket which may be applicable to different shapes of switch handles by merely modifying the portions 10 to conform to the shape of the handle to which it is desired to apply the invention.

It will also be obvious that the supporting bracket for the dog may be formed integrally with the switch handle, in which event the portions 10 would not be needed but only the upstanding arcuately shaped portion 13 with the supporting bolt 14, and other modifications may be resorted to without departing from the spirit of the invention.

Having thus described my invention, what I claim and desire to secure by Letters Patent, is:

1. In a switch stand lock, the combination with the hand lever of the switch, of a two-part bracket for clamping engagement about the hand lever and having an upwardly projecting portion, a gravity dog pivotally carried by said portion and including a depending hook-like member, and an upstanding weighted handle portion to assist in biasing the dog towards its locked position.

2. The combination with a switch stand having a pivotally mounted operating handle attached thereto, of a bracket carried by said handle having an upwardly projecting portion, and a gravity dog pivotally mounted upon said portion.

3. The combination with a switch stand having a pivotally mounted operating handle attached thereto, of a bracket carried by said handle having an upwardly projecting portion, a gravity dog pivotally mounted upon said portion, and a weighted handle for biasing the dog towards its locked position.

4. The combination with a switch stand having a pivotally mounted operating handle attached thereto, of a bracket carried by said handle having an upwardly projecting portion, a gravity dog pivotally mounted upon said portion, a weighted handle for biasing the dog toward its locked position, and a stop engageable with the bracket for limiting the throw of the dog.

5. A dog bracket for a switch stand lever, the latter being bifurcated at one end, comprising a two-part member having clamping means at one end for anchoring engagement to said lever and having an upwardly projecting portion, and means for pivotally supporting the dog upon said upwardly projecting portion.

In testimony whereof I affix my signature.

PETER SWANSON.